(12) United States Patent
Levola et al.

(10) Patent No.: US 8,384,593 B2
(45) Date of Patent: Feb. 26, 2013

(54) SYNCHRONIZED MEASUREMENT SAMPLING IN A NAVIGATION DEVICE

(75) Inventors: Aku-Matti T Levola, Tampere (FI); Florean Curticapean, Tampere (FI)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 12/917,177

(22) Filed: Nov. 1, 2010

(65) Prior Publication Data

US 2012/0105280 A1 May 3, 2012

(51) Int. Cl.
 G01S 19/37 (2010.01)
 G01S 19/24 (2010.01)
 G01S 19/34 (2010.01)
(52) U.S. Cl. .......... 342/357.77; 342/357.63; 342/357.74
(58) Field of Classification Search ............. 342/357.63, 342/357.68, 357.69, 357.74, 357.77
 See application file for complete search history.

(56) References Cited

U.S. PATENT DOCUMENTS

| 7,324,045 | B2 | 1/2008 | Mo et al. |
| 2007/0182630 | A1 * | 8/2007 | Angus ..................... 342/357.09 |
| 2008/0088506 | A1 | 4/2008 | Fischer |
| 2009/0069031 | A1 | 3/2009 | Burroughs et al. |
| 2009/0069032 | A1 | 3/2009 | Rowland et al. |
| 2009/0195446 | A1 | 8/2009 | Liao et al. |
| 2010/0004003 | A1 | 1/2010 | Duggal et al. |
| 2010/0171659 | A1 | 7/2010 | Waters et al. |

FOREIGN PATENT DOCUMENTS

WO  WO2012061328  5/2012

OTHER PUBLICATIONS

International Search Report and Written Opinion—PCT/US2011/058685—ISA/EPO—Mar. 7, 2012.

\* cited by examiner

*Primary Examiner* — Jack W Keith
*Assistant Examiner* — Fred H Mull
(74) *Attorney, Agent, or Firm* — DeLizio Gilliam, PLLC

(57) ABSTRACT

In a hot start mode of a navigation device, the process of obtaining pseudo-range measurements can be synchronized with the processes of tracking navigation satellites and initializing a positioning unit to compute a position, velocity, and time (PVT) solution of the navigation device. This can influence a time instant at which the pseudo-range measurements are determined and a time to first fix, depending on whether the navigation device is in a strong or weak signal environment. A measurement unit can receive a first indication that a predetermined number of navigation satellites have been acquired and that navigation signals transmitted by the acquired navigation satellites have been locked. The measurement unit can receive a second indication that the positioning unit has been initialized to compute the PVT solution. In response to receiving both indications, the measurement unit can obtain the pseudo-range measurements. Accordingly, the positioning unit can compute the PVT solution.

20 Claims, 7 Drawing Sheets

SYNCHRONIZED MEASUREMENT SAMPLING IN A NAVIGATION DEVICE

BACKGROUND

Embodiments of the inventive subject matter generally relate to the field of satellite navigation and, more particularly, to techniques for synchronized measurement sampling in a navigation device.

Time to first fix (TTFF) of a satellite navigation receiver represents the time the satellite navigation receiver takes to acquire and lock onto navigation satellite signals, make pseudo-range measurements, download navigation satellite ephemeris and almanac (if required), and eventually compute position, velocity and time information of the satellite navigation device. The TTFF of the satellite navigation device can vary depending on a start mode of the satellite navigation device (e.g., hot start, warm start, or cold state), visibility of navigation satellites, and other such factors.

SUMMARY

Various embodiments for synchronized measurement sampling in a navigation device are disclosed. In one embodiment, a first indication that a predetermined number of navigation satellites have been acquired and that navigation signals transmitted by the acquired navigation satellites have been locked is provided from a tracking unit of the navigation device to a measurement unit of the navigation device. A second indication that the positioning unit of the navigation device has been initialized to compute navigation parameters of the navigation device for positioning and routing the navigation device is provided from a positioning unit of the navigation device to the measurement unit of the navigation device. In response to the measurement unit receiving the first indication and the second indication, pseudo-range measurements are determined at the measurement unit based, at least in part, on the navigation signals transmitted by the acquired navigation satellites. The navigation parameters of the navigation device are computed at the positioning unit, based, at least in part, on the pseudo-range measurements.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
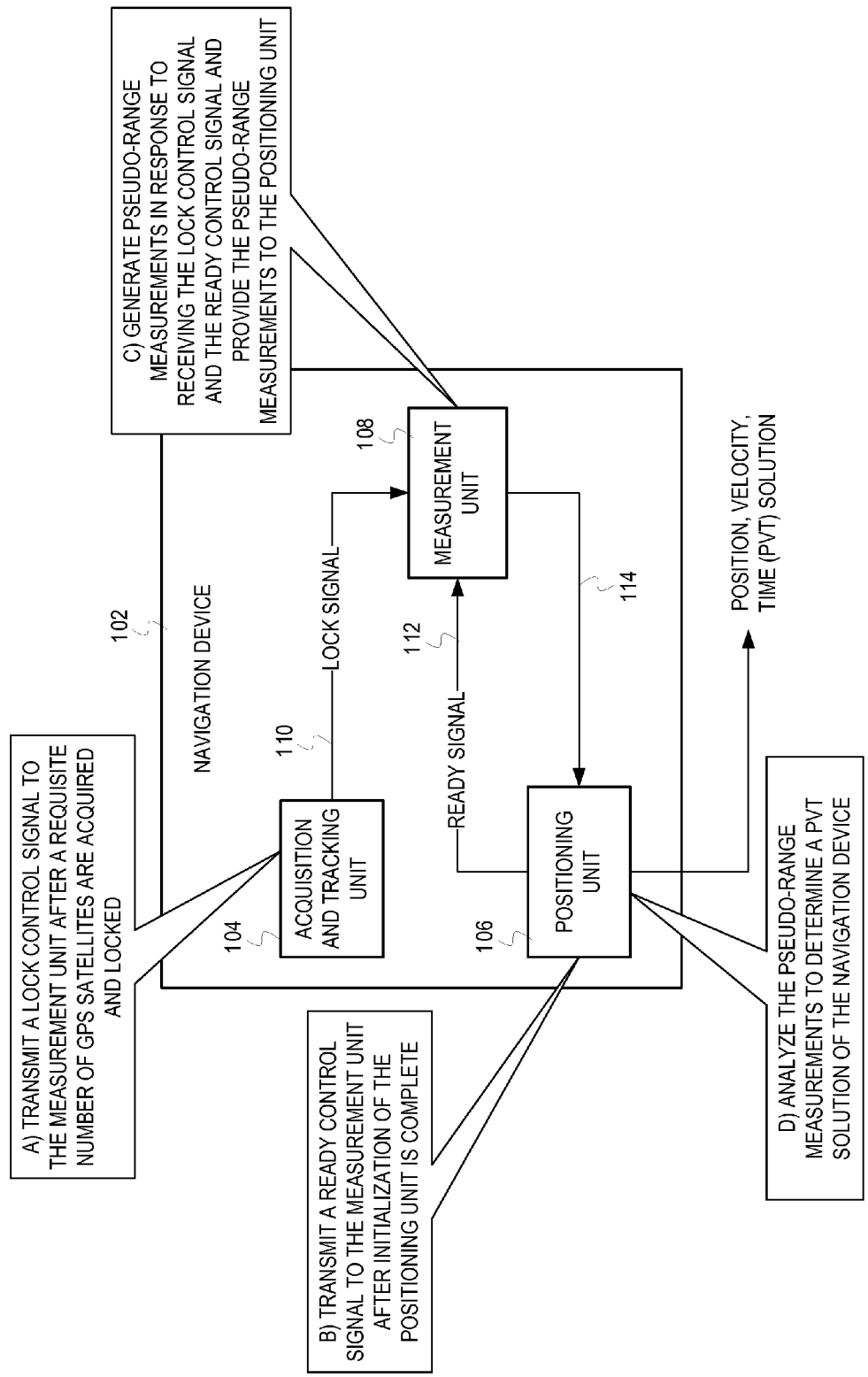
FIG. 1 is an example conceptual diagram illustrating example operations for synchronized measurement sampling in a navigation device.

The description that follows includes exemplary systems, methods, techniques, instruction sequences, and computer program products that embody techniques of the present inventive subject matter. However, it is understood that the described embodiments may be practiced without these specific details. For instance, although examples refer to techniques for synchronized measurement sampling using global positioning system (GPS) satellites, embodiments are not so limited. In other embodiments, the techniques for synchronized measurement sampling described herein can be extended to other suitable satellite navigation systems (e.g., global navigation satellite system (GLONASS), satellite-based augmentation system (SBAS)) or a combination of satellite navigation systems (e.g., a combination of GPS and GLONASS). In other instances, well-known instruction instances, protocols, structures, and techniques have not been shown in detail in order not to obfuscate the description.

In a hot start mode, the satellite navigation device has prior knowledge of a navigation satellite almanac and ephemeris, timing and position information of navigation satellites, and a last calculated position of the satellite navigation device. Thus, in the hot start mode, the satellite navigation device may only need to acquire a requisite number of satellites (e.g., four or more navigation satellites), lock on to the navigation signals transmitted by the acquired navigation satellites, and sample pseudo-range measurements. Time to first fix (TTFF) in the hot start mode relies on computing position, velocity, and time information of the satellite navigation device ("PVT solution") from the first set of pseudo-range measurements. Existing satellite navigation devices usually obtain pseudo-range measurements at predetermined periodic measurement intervals. The TTFF is typically a multiple of the measurement interval. In some scenarios, when acquisition of the navigation satellites takes longer than the expected satellite acquisition time, the pseudo-range measurements may be computed before the navigation satellites are acquired and/or before a positioning unit is initialized to compute the PVT solution. For example, when the measurement interval is one second, the first set of pseudo-range measurements may be produced one second after the start of navigation satellite acquisition. After one second, the set of pseudo-range measurements may not be available if the navigation satellites have not been acquired. Each time the satellite navigation device cannot compute the PVT solution from the obtained pseudo-range measurements, the satellite navigation device typically waits for a next set of pseudo-range measurements, and therefore the TTFF is delayed by the measurement interval. To attempt to optimize the TTFF in a hot start mode, the measurement interval can be delayed and more time can be allocated for acquiring the navigation satellites. However, the amount of time required for acquiring the navigation satellites depend on various factors, such as clear sky conditions, navigation satellite visibility, multipath, etc. Therefore, to attempt to optimize the TTFF in a weak navigation signal environment, where navigation satellite acquisition times are longer, the delay that is introduced needs to be long enough to ensure that the navigation satellites are acquired and locked before the first set of pseudo-range measurements is obtained. In a strong navigation signal environment, however, where the navigation satellite acquisition times are shorter, such a delay can impair performance and TTFF. This technique for attempting to optimize the TTFF in the hot start mode results in a tradeoff between performance in the strong navigation signal environment and better TTFF in the weak navigation signal environment. The non-deterministic nature of the navigation satellite acquisition time, the navigation signal locking time, and the processing unit initialization time can make it difficult to accurately predict a time instant at which the first set of pseudo-range measurements should be obtained. This, in turn, can impact the TTFF of the satellite navigation device in the hot start mode.

In some embodiments, the process of obtaining pseudo-range measurements can be synchronized with the process of acquiring and locking the navigation satellites and the process of initializing the positioning unit to compute the PVT solution. A satellite acquisition and tracking unit can be configured to provide a control signal to a pseudo-range measurement unit after the satellite acquisition and tracking unit acquires the navigation satellites and locks onto the navigation signals. Also, a positioning unit can be configured to provide a control signal to the pseudo-range measurement unit after the positioning unit is initialized and is ready to compute the PVT solution. The pseudo-range measurement unit can be configured to wait until both control signals are received, thus delaying or advancing the TTFF depending on whether the satellite navigation device is in a weak navigation signal environment or a strong navigation signal environment. In the strong navigation signal environment, the first set of pseudo-range measurements may be produced before the first measurement interval elapses, thus resulting in a shorter TTFF and an improvement in performance. In the weak navigation signal environment, the first set of pseudo-range measurements may be produced after the first measurement interval elapses but before a second measurement interval elapses, thus delaying the TTFF but without having to wait until the second measurement interval elapses. For example, when the measurement interval is set to 1 second, if the first set of pseudo-range measurements cannot be produced at 1 second, the satellite navigation device need not wait for an entire measurement interval prolonging the TTFF to 2 seconds. Instead, the satellite navigation device can determine the first set of pseudo-range measurements when available (e.g., at 1.25 seconds), thus resulting in a comparatively shorter TTFF (e.g., 1.25 seconds instead of 2 seconds) and enabling the satellite navigation device to compute the PVT solution as soon as possible after the first measurement interval.

FIG. 1 is an example conceptual diagram illustrating example operations for synchronized measurement sampling in a navigation device. FIG. 1 depicts a navigation device 102 comprising an acquisition and tracking unit 104, a positioning unit 106, and a measurement unit 108. When the navigation device 102 is started in a "hot start" mode, the navigation device 102 is typically aware of the last calculation position of the navigation device 102, which GPS satellites were visible at the navigation device 102 (i.e., which GPS satellites were acquired), and usually has a valid satellite almanac or ephemeris. When the navigation device 102 is powered on, hardware components of the navigation device 102 are initialized. After the hardware components are initialized, the acquisition and tracking unit 104, the positioning unit 106, and the measurement unit 108 attempt to acquire and track GPS satellites, analyze GPS signals received from the acquired GPS satellites, and determine a new position of the navigation device 102, as will be described with reference to stages A-D.

At stage A, the acquisition and tracking unit 104 transmits a lock control signal 110 to the measurement unit 108 after a requisite number of GPS satellites are acquired and locked. Typically, the acquisition and tracking unit 104 attempts to acquire at least four GPS satellites so that a position, velocity, and time information of the navigation device 102 ("PVT solution") can be determined. The acquisition and tracking unit 104 can, based on the satellite almanac and ephemeris, perform a search for visible/available GPS satellites, and compensate for Doppler offset and other phase and frequency offsets. The acquisition and tracking unit 104 can identify four or more visible GPS satellites such that the strength of the GPS signals received from the GPS satellites is at least at a threshold signal level. In the hot start mode, GPS satellite acquisition time can vary from tens of milliseconds to few seconds depending on the visibility of the GPS satellites and whether clear sky conditions are available. After the four or more GPS satellites are acquired, the acquisition and tracking unit 104 can lock onto the GPS signals transmitted by the acquired GPS satellites and can continue to track the acquired GPS satellites. In the hot start mode, the acquisition and tracking unit 104 can typically lock onto the GPS signals transmitted by the acquired GPS satellites in about 400-500 milliseconds. The acquisition and tracking unit 104 can then transmit the control lock signal 110 indicating that the acquisition and tracking unit 104 has acquired four or more GPS satellites and has locked onto the GPS signals transmitted by the acquired GPS satellites. In other words, the lock control signal 110 can indicate, to the measurement unit 106, that the requisite number of GPS signals are available for computing the PVT solution. In one implementation, the lock control signal 110 may be a bit (e.g., transmitted as part of a message) that is set to indicate that the acquisition and tracking unit 104 has locked onto the GPS signals. It is noted, however, that in other implementations the lock control signal 110 can be provided by other techniques, such as providing a voltage level on a physical wire or setting a bit in a configuration register.

At stage B, the positioning unit 106 transmits a ready control signal 112 to the measurement unit 108 after initialization of the positioning unit 106 is complete. In one implementation, the positioning unit 106 may be implemented in software. After the hardware components of the navigation device 102 are initialized, the positioning unit 106 can boot and can initialize its data structures. In the hot start mode, the positioning unit 106 can access a known memory location (e.g., a local data structure on the navigation device 102) to identify the satellite almanac and ephemeris. The almanac comprises information about GPS satellite orbits and allows the acquisition and tracking unit 104 to predict which GPS satellites will be visible to the acquisition and tracking unit 104, thus shortening acquisition time. The ephemeris comprises precision corrections to the almanac and enables the acquisition and tracking unit 104 to determine an accurate position of the GPS satellites. After the positioning unit 106 is initialized, the positioning unit 106 can transmit the ready control signal 112 to the measurement unit 106 to indicate that the positioning unit 106 is ready to compute the PVT solution. As described above, in one implementation, the ready control signal 112 may be a bit (e.g., transmitted as part of a message) that is set to indicate that the positioning unit 106 is initialized and is ready to compute the PVT solution. It is noted, however, that in other implementations, the ready control signal 112 can be provided by other techniques, such as providing a voltage level on a physical wire or setting a bit in a configuration register.

At stage C, the measurement unit 108 generates pseudo-range measurements in response to receiving the lock control signal 110 from the acquisition and tracking unit 104 and the ready control signal 112 from the positioning unit 106. A pseudo-range measurement refers to an approximate distance between the acquired GPS satellites and the navigation device 102. The measurement unit 108 can determine a time difference between a time instant at which a GPS signal was transmitted by a GPS satellite (i.e., an acquired and locked GPS satellite) and a time instant at which the transmitted GPS signal was received at the navigation device 102 (e.g., by the acquisition and tracking unit 104). The measurement unit 108 can multiply the time difference by the speed of light (i.e., $3 \times 10^8$ meters/second) to generate the pseudo-range measurement. Because the position of the navigation device 102 and the GPS satellites varies with time, the measurement unit 108 can determine the pseudo-range measurements at periodic intervals (also called sampling pseudo-range measurements). The measurement unit 108 can then provide the pseudo-range measurements to the positioning unit 106. It is noted that the measurement unit 108 generates the first set of pseudo-range measurements only after receiving both the lock control signal 110 and the ready control 112. In doing so, the measurement unit 108 can ensure that the first set of pseudo-range measurements are determined after the acquisition and tracking unit 104 has locked onto four or more GPS signals and after the positioning unit 106 is ready to process the pseudo-range measurements.

At stage D, the positioning unit 106 analyzes the pseudo-range measurements to determine the PVT solution of the navigation device 102. Based on the pseudo-range measurements and based on knowledge of the position of the GPS satellites (e.g., from the almanac and ephemeris), the positioning unit 106 can calculate the PVT solution of the navigation device 102. In one implementation, the pseudo-range measurements can be used to calculate a three-dimensional position of the navigation device 102 in Earth-Centered, Earth-Fixed X, Y, Z (ECEF XYZ) coordinates. In other implementations, the position of the user navigation device 102 can be determined in terms of any suitable coordinate system (e.g., latitudes and longitudes, geodetic coordinates, etc.). The positioning unit 106 can calculate time information of the navigation device 102, e.g., to correct time offset in the navigation device clock. The positioning unit 106 can also calculate the velocity of the user navigation device 102 based on the change in the position of the user navigation device 102 over time, based on calculated Doppler shift, etc.

Figure 2:
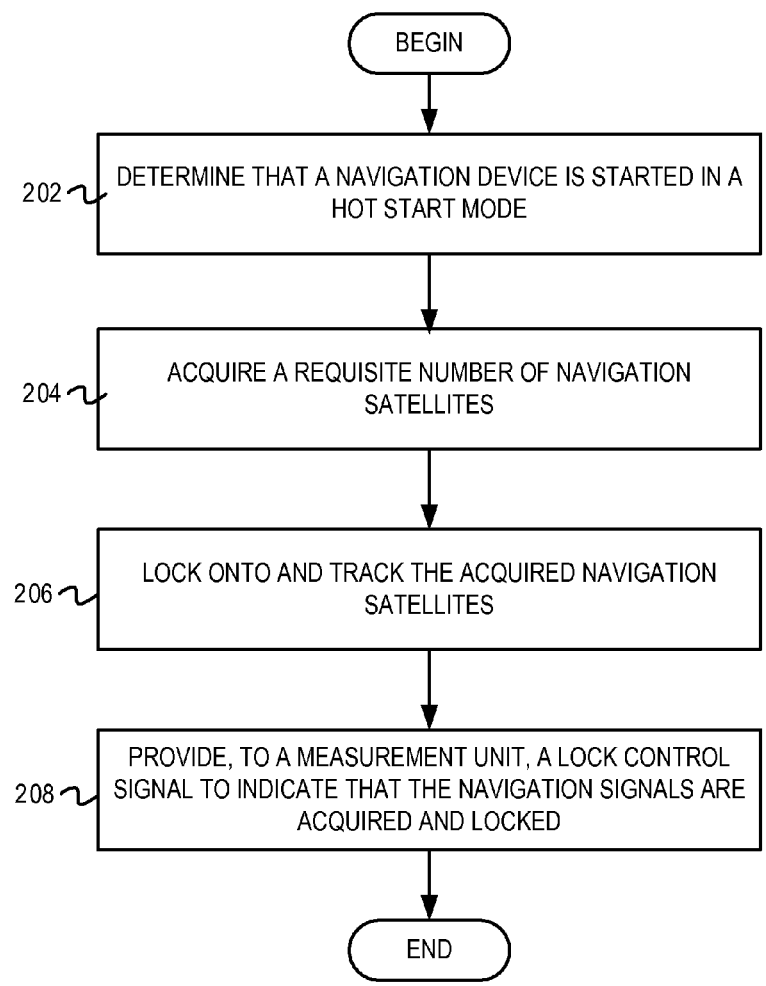
FIG. 2 is a flow diagram illustrating example operations of a satellite acquisition and tracking unit for transmitting a lock control signal.

FIG. 2 is a flow diagram ("flow") 200 illustrating example operations of a satellite acquisition and tracking unit for transmitting a lock control signal. The flow 200 begins at block 202.

At block 202, it is determined that a navigation device is started in a hot start mode. For example, the acquisition and tracking unit 104 of FIG. 1 can determine that the navigation device 102 is started in the hot start mode. In the hot start mode, the navigation device 102 typically has a valid satellite almanac and ephemeris, timing information, a last calculated position of the navigation device 102, and knowledge of previously acquired GPS satellites. After the navigation device 102 is started, hardware components of the navigation device 102 are initialized. Furthermore, the acquisition and tracking unit 104 can also be initialized. For example, hardware components of the acquisition and tracking unit 104 can be initialized, software components of the acquisition and tracking unit 104 can be booted, etc. The flow continues at block 204.

At block 204, a requisite number of navigation satellites are acquired. For example, the acquisition and tracking unit 104 can acquire four or more GPS satellites. As described above, with reference to FIG. 1, the acquisition and tracking unit 104 can, based on the satellite almanac and ephemeris, perform a search of visible/available GPS satellites (e.g., search for pseudo-random codes of the GPS satellites) and identify GPS satellites where the strength of received GPS signals is greater than or equal to a threshold signal strength. It is noted that the time required for the acquisition and tracking unit 104 to acquire the four or more GPS satellites can be variable. The flow continues at block 206.

At block 206, the acquired navigation satellites are tracked. For example, the acquisition and tracking unit 104 can lock onto the GPS signals received from the acquired GPS satellites and can track the acquired GPS satellites. The acquisition and tracking unit 104 can compensate for phase and frequency offsets (e.g., Doppler offset), refine GPS satellite position information, lock onto the GPS signals transmitted by the acquired GPS satellites, and track the acquired GPS satellites. It is noted that the time required for the acquisition and tracking unit 104 to lock onto the GPS signals can be variable. The flow continues at block 208.

At block 208, a lock control signal is provided to a measurement unit to indicate that the navigation satellites have been acquired and locked. For example, the acquisition and tracking unit 104 generates the lock control signal 110 to indicate that the acquisition and tracking unit 104 has acquired four or more GPS satellites and has locked onto the GPS signals received from the acquired GPS satellites. The acquisition and tracking unit 104 provides the lock control signal 110 to the measurement unit 108 of FIG. 1.

In some implementations, after locking onto the GPS signals, the acquisition and tracking unit 104 may wait for a fixed locking time delay to improve the accuracy of the lock, before transmitting the lock control signal 110. The locking time delay can be a controlled trade-off between a short time to first fix and an acceptable positioning error (or accuracy). In other words, the acquisition and tracking unit 104 can allocate the additional locking time delay to further refine measurements (e.g., by running correlators for the locking time delay) and to achieve a better lock on the GPS signals, so that navigation parameters of the navigation device 102 can be generated with high accuracy (i.e., smaller positioning errors). In some cases, allocating the additional locking time delay can also enable the acquisition and tracking unit 104 to acquire new GPS satellites and lock onto new GPS signals. In some embodiments, the acquisition and tracking unit 104 can select the additional locking time delay depending on an acceptable percentage of positioning errors. For example, the acquisition and tracking unit 104 can select a relatively larger locking time delay if very precise positioning is required and large positioning errors are unacceptable. As another example, the acquisition and tracking unit 104 can select a relatively short locking time delay if a larger percentage of positioning errors are acceptable. In some implementations, if a larger percentage of positioning errors is acceptable (or if locking errors are below a predetermined error threshold), the acquisition and tracking unit 104 may not wait for the locking time delay to achieve a better lock on the GPS signals. Instead, the acquisition and tracking unit 104 can provide the lock control signal 110 to the measurement unit 108 as soon as the first lock on the GPS signals is obtained. From block 208, the flow ends.

Figure 3:
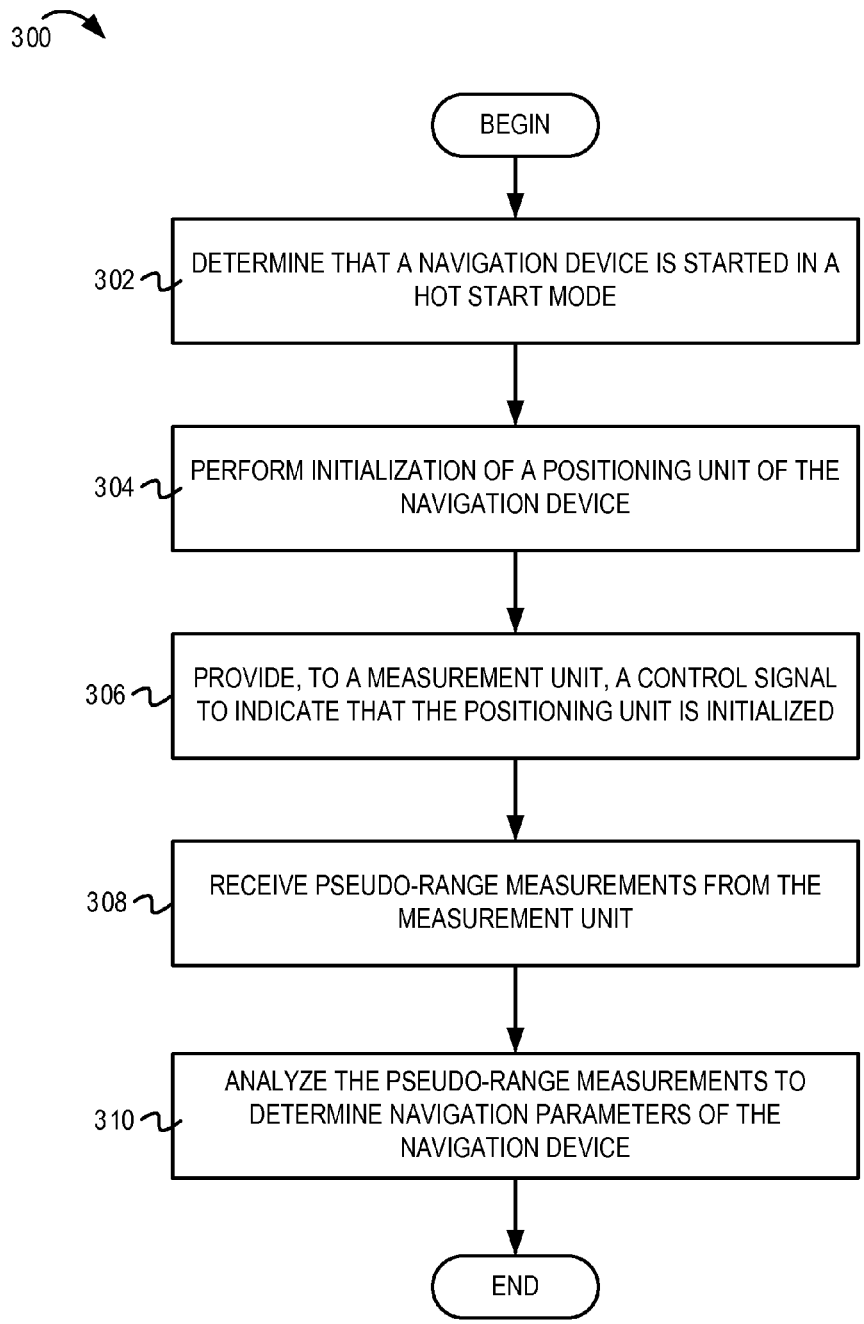
FIG. 3 is a flow diagram illustrating example operations for determining navigation parameters of a navigation device.

FIG. 3 is a flow diagram 300 illustrating example operations for determining navigation parameters of a navigation device. The flow 300 begins at block 302.

At block 302, it is determined that a navigation device is started in a hot start mode. For example, the positioning unit 108 of FIG. 1 can determine that the navigation device is started in the hot start mode. As described above, after the navigation device 102 is started, hardware components of the navigation device 102 are initialized. The flow continues at block 304.

At block 304, the positioning unit of the navigation device is initialized. For example, a processor associated with positioning unit 106 can be booted and data structures and other components of the positioning unit 106 can be initialized. Additionally, as described in FIG. 1, the positioning unit 106 can also access a predetermined memory location (e.g., a local data structure on the navigation device 102) to identify a satellite almanac and ephemeris to enable calculation of the navigation parameters (e.g., position velocity, time information, etc.) of the navigation device 102. The flow continues at block 306.

At block 306, a ready control signal is provided to a measurement unit to indicate that the positioning unit is initialized. For example, the positioning unit 106 can transmit the ready control signal 112 to the measurement unit 108 to indicate that the positioning unit 106 is initialized. The ready control signal 112 can also serve as an indication to the measurement unit 108 that the positioning unit 106 is ready to analyze pseudo-range measurements and compute the navigation parameters. The flow continues at block 308.

At block 308, pseudo-range measurements are received from the measurement unit. For example, the positioning unit 106 can receive the pseudo-range measurements 114 from the measurement unit 108. As described above in FIG. 1, the pseudo-range measurements are an approximate distance between the acquired GPS satellites and the navigation device 102. As will be described with reference to FIGS. 4, 5A, 5B, and 5C, the measurement unit 108 generates the pseudo-range measurements 114 after both the positioning unit 106 and an acquisition and tracking unit 104 transmit their respective control signals. The flow continues at block 310.

At block 310, the pseudo-range measurements are analyzed to determine the navigation parameters of the navigation device. For example, the positioning unit 106 can analyze the pseudo-range measurements 114 to determine the navigation parameters, including the position, velocity, and time information, of the navigation device 102 (as was described above with reference to FIG. 1). The positioning unit 106 can provide the navigation parameters of the navigation device 102 for presentation by the navigation device 102. The navigation device 102 can display the current position, the velocity, and the time information of the navigation device 102. In one example, the navigation device 102 can display the current position of the navigation device 102 in terms of location coordinates. In another example, the navigation device 102 can display a map and indicate the current position of the navigation device 102 on the map. In some implementations, a routing unit of the navigation device 102 can use the calculated navigation parameters of the navigation device 102 to determine a route to a destination. In this implementation, the navigation device 102 can also present the route and corresponding routing directions to the destination. From block 310, the flow ends.

Figure 4:
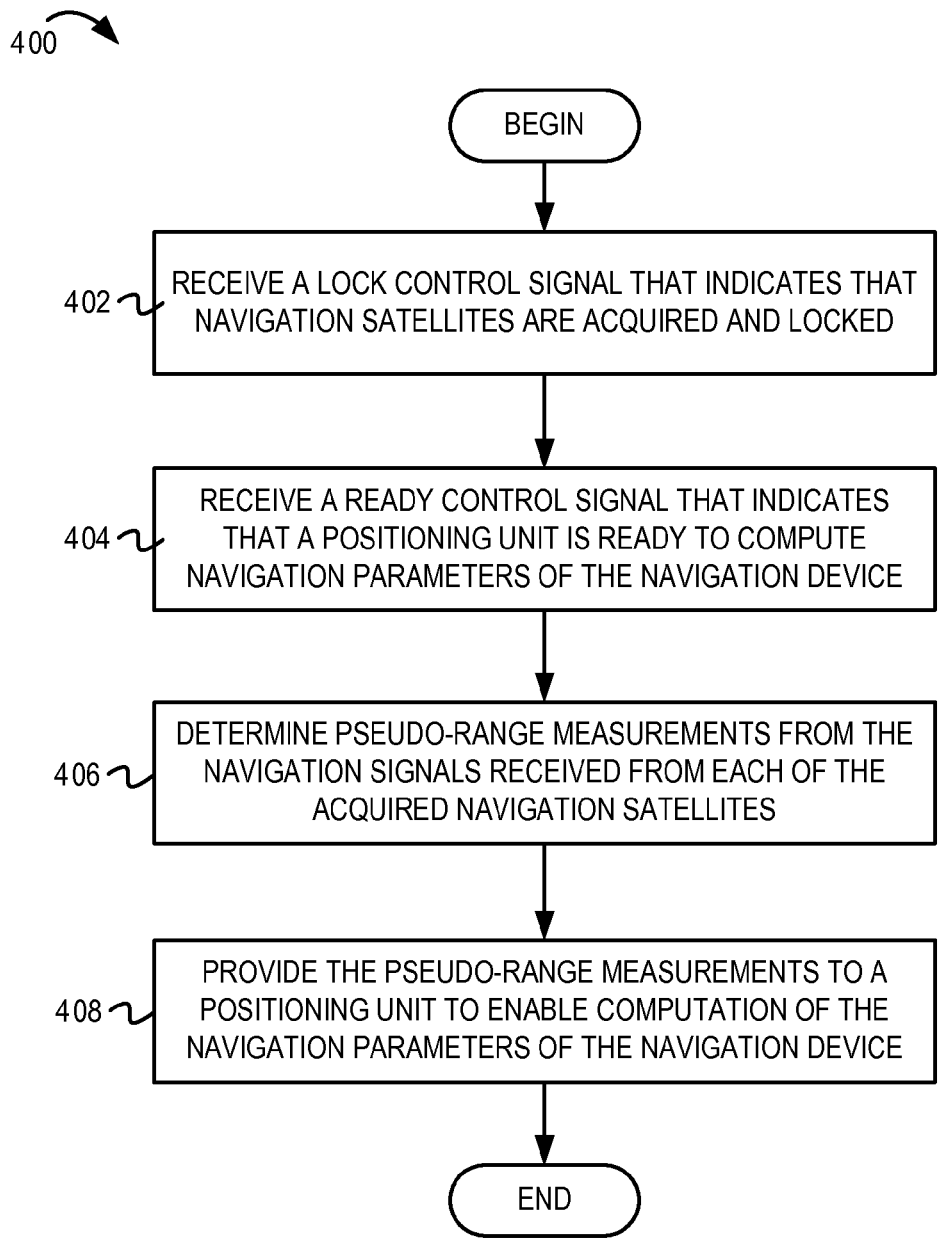
FIG. 4 is a flow diagram illustrating example operations for generating pseudo-range measurements.

FIG. 4 is a flow diagram 400 illustrating example operations for generating pseudo-range measurements. The flow 400 begins at block 402.

At block 402, a lock control signal that indicates that navigation satellites are acquired and locked is received. For example, the measurement unit 108 of FIG. 1 can receive the lock control signal 110 that indicates that the acquisition and tracking unit 104 has acquired four or more GPS satellites and has locked onto GPS signals transmitted by the acquired GPS satellites. The lock control signal 100 can also indicate that the GPS signals can now be used to determine pseudo-range measurements. The flow continues at block 404.

At block 404, a ready control signal that indicates that a positioning unit is ready to compute the navigation parameters of the navigation device is received. For example, the measurement unit 108 can receive the ready control signal 112 that indicates that the positioning unit 106 of FIG. 1 is initialized, and is ready to analyze pseudo-range measurements to compute the navigation parameters of the navigation device 102. The flow continues at block 406.

At block 406, the pseudo-range measurements are determined from the navigation signals received from each of the acquired navigation satellites. For example, the measurement unit 108 determines the pseudo-range measurements from the GPS signals received from the acquired GPS satellites, as was described above with reference to FIG. 1. The flow continues at block 408.

At block 408, the pseudo-range measurements are provided to the positioning unit to enable computation of the navigation parameters of the navigation device. For example, the measurement unit 108 provides the pseudo-range measurements 114 to the positioning unit 106. As described above, the positioning unit 106, in turn, can compute the navigation parameters (e.g., position, velocity, time information) of the navigation device 102 based, at least in part, on the pseudo-range measurements 114. From block 410, the flow ends.

It is noted that in some implementations, after the navigation device 102 is started (e.g., powered up) and after the hardware components of the navigation device 102 are initialized, the measurement unit 108 can periodically check to determine whether both the lock control signal 110 and the ready control signal 112 have been provided by the acquisition and tracking unit 104 and the positioning unit 106. The measurement unit 108 may not generate the pseudo-range measurements until the acquisition and tracking unit 104 has locked onto the GPS signals and until the positioning unit 106 is ready to process the pseudo-range measurements. Thus, the lock control signal 110 and the ready control signal 112 can serve to either advance or delay a measurement point (i.e., a time instant at which the pseudo-range measurement is determined), as will be described below in FIGS. 5A-5C.

Figure 5A:
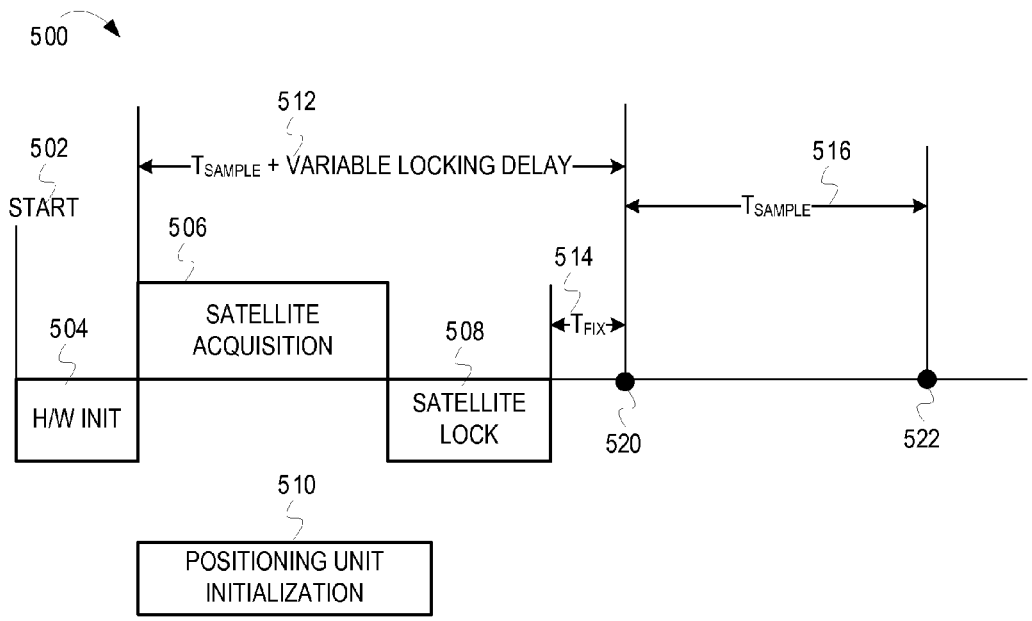
FIG. 5A is an example timing diagram illustrating synchronized measurement sampling during a long satellite acquisition interval.

FIG. 5A is an example timing diagram 500 illustrating synchronized measurement sampling during a long satellite acquisition interval. As depicted in FIG. 5A, the navigation device 102 of FIG. 1 is started at time instant 502. For example, the navigation device 102 may be powered up in a hot start mode, may be enabled from a stand-by or a sleep mode, may regain visibility of the GPS satellites after being temporarily occluded from the GPS satellites (e.g., when the navigation device 102 is in a tunnel), etc. After the navigation device 102 starts, hardware components of the navigation device 102 are initialized during time interval 504. After the hardware components of the navigation device 102 are initialized, the acquisition and tracking unit 104 begins acquiring the GPS satellites, while the positioning unit 106 also begins initialization operations. In one example, four or more GPS satellites are acquired during time interval 506. After four or more GPS satellites are acquired, the acquisition and tracking unit 104 attempts to lock onto GPS signals received from the acquired GPS satellites during time interval 508, as described with reference to FIG. 2. While the acquisition and tracking unit 104 acquires the GPS satellites and locks onto the GPS signals, the positioning unit 106 is initialized during time interval 510, as described with reference to FIG. 3. The positioning unit 106 transmits the ready control signal 112 after the positioning unit 106 is initialized i.e., after the time interval 510 elapses. The acquisition and tracking unit 104 transmits the lock control signal 110 after the acquisition and tracking unit 104 locks onto the GPS signals, i.e., after the time interval 508 elapses. In FIG. 5A, the navigation device 102 is in a weak signal environment (e.g., GPS signals are weak, clear sky conditions are not available, etc). Therefore, the acquisition and tracking unit 104 takes a relatively long time to acquire the GPS satellites and lock onto the GPS signals. In FIG. 5A, the time interval 508 elapses after the time interval 510 elapses, or in other words, the acquisition and tracking unit 104 locks onto the GPS signals after the positioning unit 106 is initialized.

In some implementations, the acquisition and tracking unit 104 can wait for a fixed time delay ($T_{fix}$) 514 before transmitting the lock control signal 110 to the measurement unit 108. In other words, instead of transmitting the lock control signal 110 as soon as a first lock on the GPS signals is achieved (i.e., after the time interval 508 expires), the acquisition and tracking unit 104 can transmit the lock control signal 110 after the time delay 514 elapses. As described above with reference to FIG. 2, the fixed time delay 514 can enable the acquisition and tracking unit 104 to further refine estimates of the position of the GPS satellites, achieve a better lock on the GPS signals, and possibly even acquire new GPS satellites. If the acquisition and tracking unit 104 waits for the fixed time delay 514, the measurement unit 108 receives both the lock control signal 110 and the ready control signal 112 at a first measurement point 520, after the time delay 514 expires. At the first measurement point 520, the measurement unit 108 generates pseudo-range measurements 114 and provides the pseudo range measurements 114 to the positioning unit 106. The positioning unit 106, in turn, determines the PVT solution. The first measurement point 520 represents a first time instant at which the pseudo-range measurements 114 can be generated to enable computation of the PVT solution. In some scenarios, however, the acquisition and tracking unit 104 does not wait for the fixed time delay 514 and may transmit the lock control signal as soon as the time interval 508 elapses. In this scenario, the first measurement point would be at the time instant when the time interval 508 elapses and the pseudo-range measurements 114 could be generated (at the time instant when the time interval 508 elapses) to enable computation of the PVT solution.

The time interval 512 that spans from the instant at which the hardware components are initialized (after the time interval 504 expires) to the first measurement point 520 is referred to herein as an initial measurement interval. The sum of the initial measurement interval 512 and the hardware initialization time interval 504 is referred to as the time to first fix (TTFF). In FIG. 5A, the initial measurement interval 512 is greater than a predetermined measurement interval ($T_{sample}$) 516 between subsequent measurement points. In some implementations, the predetermined measurement interval 516 can be 1 second. However, in other implementations, the predetermined measurement interval 516 can be any suitable time interval. The measurement unit 108 determines pseudo-range measurements at each measurement point and each measurement point is separated by the predetermined measurement interval 516. It is noted that the time interval for GPS satellite acquisition 506, the time interval for locking onto GPS signals 508, and the time interval for initializing the positioning unit 510 are variable, and therefore any of the operations executed during the time intervals 506, 508, and 510 can contribute to delaying or advancing the first measurement point 520. In FIG. 5A, the first measurement point 520, and consequently the TTFF, is delayed until the acquisition and tracking unit 104 locks onto the GPS signals. In other words, the measurement unit 108 delays generating and providing the pseudo-range measurements until both the satellite acquisition and tracking unit 104 locks onto the GPS signals and the positioning unit 106 is ready to compute the PVT solution. After the first measurement point 520, the measurement unit 108 computes the next pseudo-range measurements after the predetermined time interval 516 (i.e., at measurement point 522).

Figure 5B:
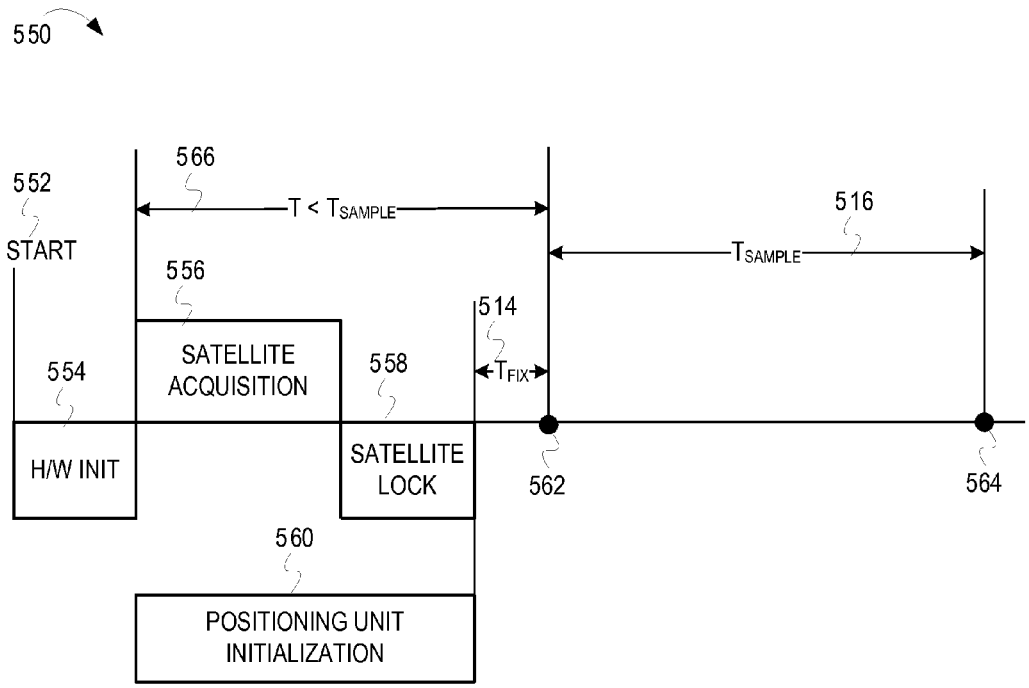
FIG. 5B is an example timing diagram illustrating synchronized measurement sampling during a short satellite acquisition interval.

FIG. 5B is an example timing diagram 550 illustrating synchronized measurement sampling during a short satellite acquisition interval. As depicted in FIG. 5B, the navigation device 102 is started at time instant 552 and hardware components of the navigation device 102 are initialized during time interval 554. After the hardware components of the navigation device 102 are initialized, the acquisition and tracking unit 104 begins acquiring the GPS satellites, while the positioning unit 106 also begins initialization operations. In one example, four or more GPS satellites are acquired during time interval 556. After four or more GPS satellites are acquired, the acquisition and tracking unit 104 locks onto GPS signals received from the acquired GPS satellites during time interval 558. While the acquisition and tracking unit 104 acquires the GPS satellites and locks onto the GPS signals, the positioning unit 106 is initialized during time interval 560. The positioning unit 106 transmits the ready control signal 112 after the time interval 560 elapses. The acquisition and tracking unit 104 transmits the lock control signal 110 after the time interval 558 elapses. It is noted that the time interval for GPS satellite acquisition 556, the time interval for locking onto GPS signals 558, and the time interval for initializing the positioning unit 560 are variable. Therefore, any of the operations executed during the time intervals 556, 558, and 560 can contribute to delaying or advancing a first measurement point and consequently the TTFF. In FIG. 5B, the navigation device 102 is in a strong signal environment (e.g., GPS signals are strong, clear sky conditions are available, etc.). Therefore, the acquisition and tracking unit 104 acquires the GPS satellites in a short time interval. In FIG. 5B, the time interval 558 and the time interval 560 elapse almost simultaneously. The positioning unit 106 transmits the ready control signal 112 after the positioning unit 106 is initialized and is ready to compute the PVT solution. As described above, in some implementations, the acquisition and tracking unit 104 can wait for the fixed time delay ($T_{fix}$) 514 before transmitting the lock control signal 110 to the measurement unit 108.

The measurement unit 108 receives the lock control signal 110 and the ready control signal 112 at the first measurement point 562. The time interval 566 that spans from the time instant at which the hardware components of the navigation device 102 are initialized (after the time interval 554 expires) to the first measurement point 562 is the initial measurement interval. The sum of the initial measurement interval 566 and the hardware initialization time interval 554 is the TTFF. In FIG. 5B, the initial measurement interval 566 is less than the predetermined measurement interval ($T_{sample}$) 516. Because the acquisition and tracking unit 104 and the positioning unit 106 transmit their respective control signals to the measurement unit 108 before the predetermined measurement interval 516 elapses, the measurement unit 108 executes operations for generating and providing the pseudo-range measurements at an earlier point in time. Consequently, the initial measurement interval 566 may be less than the predetermined measurement interval 516 and the TTFF may also be less than an expected TTFF of the navigation device 102. After the first measurement point 562, the measurement unit 108 computes the next pseudo-range measurements after the predetermined time interval 516 (i.e., at the measurement point 564).

Figure 5C:
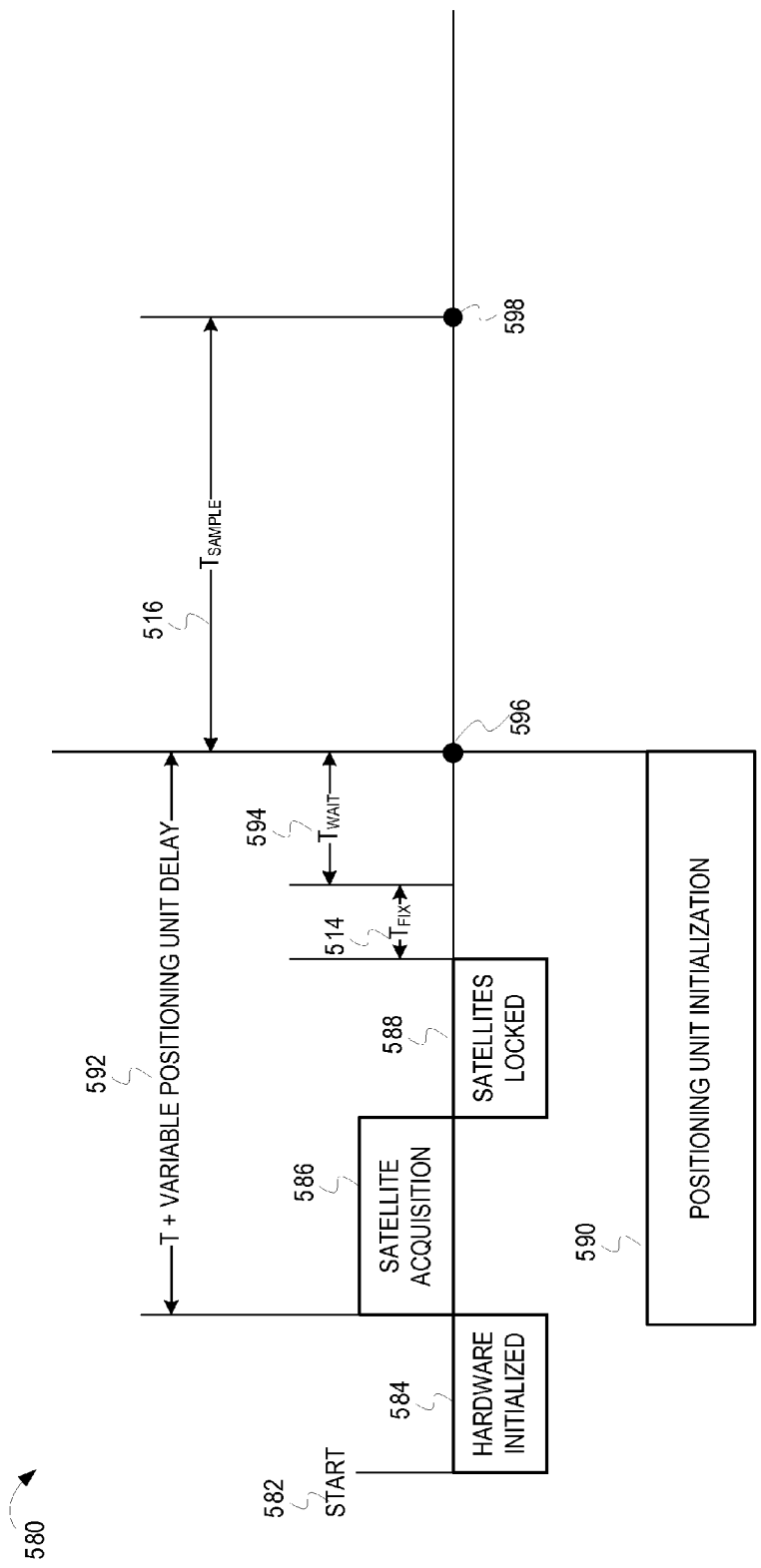
FIG. 5C is an example timing diagram illustrating synchronized measurement sampling during a long positioning unit initialization interval.

FIG. 5C is an example timing diagram 580 illustrating synchronized measurement sampling during a long positioning unit initialization interval. As depicted in FIG. 5C, the navigation device 102 is started at time instant 582 and hardware components of the navigation device 102 are initialized during time interval 584. After the hardware components of the navigation device 102 are initialized, the acquisition and tracking unit 104 begins acquiring the GPS satellites, while the positioning unit 106 also begins initialization operations. The GPS satellites are acquired during time interval 586. After a requisite number of GPS satellites are acquired, the acquisition and tracking unit 104 locks onto GPS signals received from the acquired GPS satellites during time interval 588. While the acquisition and tracking unit 104 acquires GPS satellites and locks onto the GPS signals, the positioning unit 106 is initialized during time interval 590.

The time interval 586 for GPS satellite acquisition, the time interval 588 for locking onto GPS signals, and the time interval 590 for initializing the positioning unit are variable, and therefore any of the operations executed during the time intervals 586, 588, and 590 can contribute to delaying or advancing a first measurement point and the TTFF. In FIG. 5C, the navigation device 102 is in a strong signal environment and therefore, the acquisition and tracking unit 104 acquires the GPS satellites and locks onto the GPS signals in a short time interval. However, in FIG. 5C, the positioning unit 106 takes a long time to initialize (e.g., because the positioning unit 106 is unable to identify the almanac or ephemeris). After the acquisition and tracking unit 104 locks onto the GPS signals, the acquisition and tracking unit 104 waits for the fixed time delay ($T_{fix}$) 514 before transmitting the lock control signal 110 to the measurement unit 108. In FIG. 5C, after the fixed time delay 514 elapses, the positioning unit 106 requires an additional time interval ($T_{wait}$) 594 to complete initialization operations. After the additional time interval 594 elapses and the positioning unit 106 is initialized, the positioning unit transmits the ready control signal 112 to indicate that the positioning unit 106 is ready to compute the PVT solution. In some implementation, while the positioning unit 106 completes the initialization operations, the acquisition and tracking unit 104 can use the additional time interval 594 to attempt to achieve a better lock on the GPS signals and to possibly acquire new GPS satellites.

The measurement unit 108 receives the lock control signal 110 and the ready control signal 112 at the first measurement point 596. Time interval 592 that spans from the instant at which the hardware components of the navigation device 102 are initialized (after the time interval 584 expires) to the first measurement point 596 is the initial measurement interval. The sum of the initial measurement interval 592 and the hardware initialization time interval 584 is the TTFF. In FIG. 5C, the initial measurement interval 592 is greater than the predetermined measurement interval 516 because the measurement unit 108 delays generating and providing the pseudo-range measurements until the positioning unit 106 is ready to compute the PVT solution. After the first measurement point 596, the measurement unit 108 computes the next pseudo-range measurements after the predetermined time interval 516 (i.e., at the measurement point 598).

It should be understood that the depicted diagrams (FIGS. 1-5C) are examples meant to aid in understanding embodiments and should not be used to limit embodiments or limit scope of the claims. Embodiments may perform additional operations, fewer operations, operations in a different order, operations in parallel, and some operations differently. For example, although FIGS. 1-5C describe operations for synchronized measurement sampling when the navigation device 102 is started in the hot stat mode, embodiments are not so limited. The operations for synchronized measurement sampling can be implemented in other scenarios where prior GPS satellite position and timing information (e.g., in the form of an almanac, ephemeris, etc.) are available at the navigation device 102, such as when GPS signals are temporarily occluded (e.g., after the navigation device 102 exits a tunnel), when the navigation device is started from a standby or sleep mode, etc. Furthermore, although the operations of FIGS. 1-5C are described with reference to navigation device 102 in the hot start mode, in other implementations, the operations described herein can also be implemented when the navigation device starts in a warm start mode or even in a cold start mode.

As described above, the acquisition and tracking unit 104 acquires and locks onto four or more GPS satellites. However, if a vertical position (e.g., a height or elevation information) of the navigation device 102 is not required, three GPS satellites may be sufficient to determine a horizontal position of the navigation device 102 and route the navigation device 102 along a horizontal plane. Consequently, the acquisition and tracking unit 104 may acquire at least three GPS satellites and may generate the lock control signal 110 after locking onto GPS signals from at least three GPS satellites.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
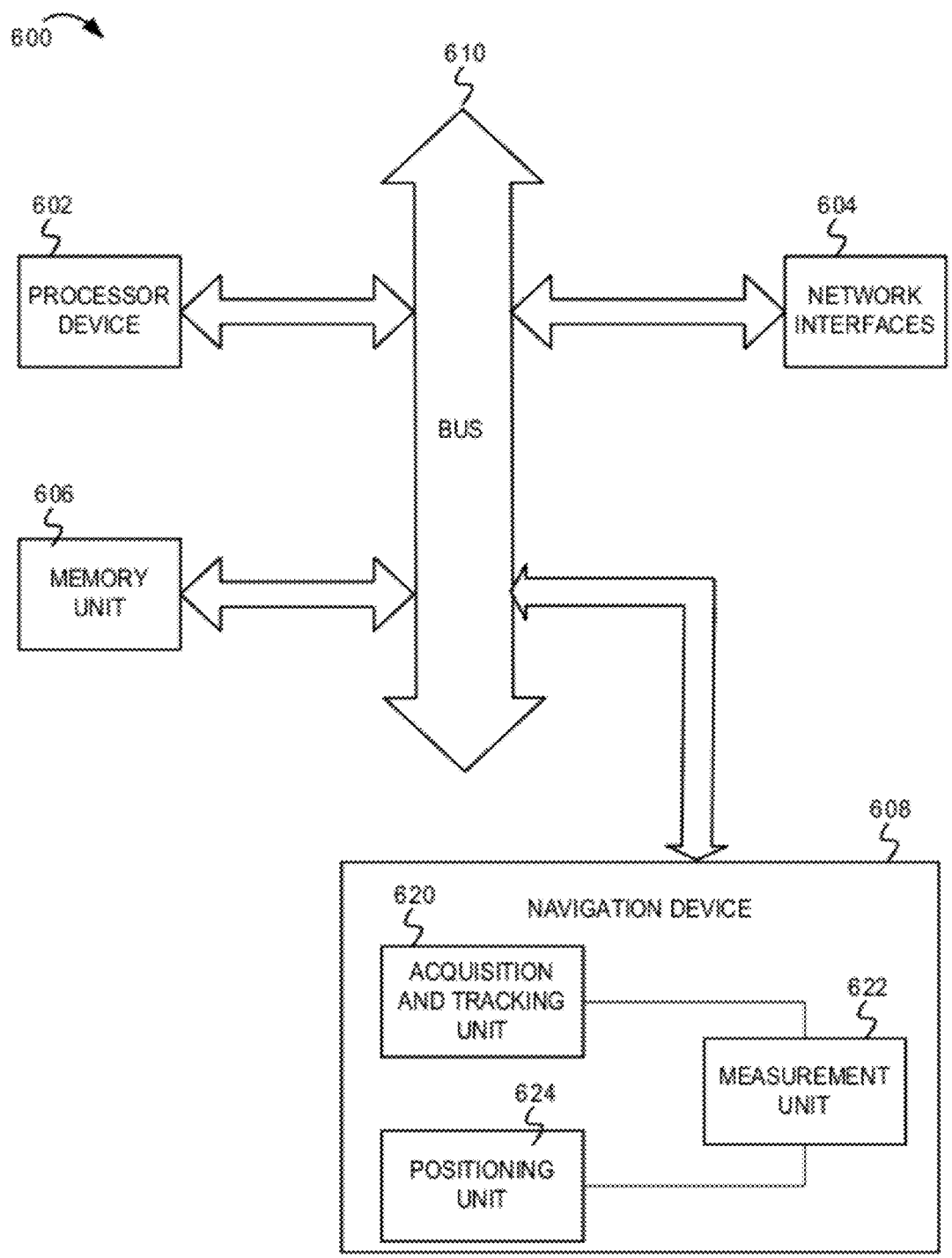
FIG. 6 is a block diagram of one embodiment of an electronic device including a mechanism for synchronized measurement sampling.

FIG. 6 is a block diagram of one embodiment of an electronic device 600 including a mechanism for synchronized measurement sampling in a navigation device. In some implementations, the electronic device 600 can be a dedicated user navigation device (e.g., a portable GPS system) configured to determine the location of the user navigation device and routing directions to a destination. In another implementation, the electronic device 600 may be an electronic device, such as a laptop, a netbook, a mobile phone, a personal digital assistant (PDA), a smartphone, or other portable electronic systems, which includes a navigation module or a navigation unit. The electronic device 600 includes a processor device 602 (possibly including multiple processors, multiple cores, multiple nodes, and/or implementing multi-threading, etc.). The electronic device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 also includes a bus 610 (e.g., PCI, ISA, PCI-Express, HyperTransport®, Infini-Band®, NuBus, etc.), and network interfaces 604 that include one or more of a wireless network interface (e.g., a WLAN interface, a Bluetooth® interface, a WiMAX interface, a Zig-Bee® interface, a Wireless USB interface, etc.) or a wired network interface (e.g., an Ethernet interface, etc.).

The electronic device 600 also includes a navigation unit 608. The navigation unit 608 comprises an acquisition and tracking unit 620, a measurement unit 622, and a positioning unit 624. The navigation unit 608 executes operations described herein with reference to FIGS. 1-5C for synchronized measurement sampling. The acquisition and tracking unit 620 can transmit a lock control signal to the measurement unit 622 after a requisite number of GPS satellites are acquired and locked. The positioning unit 624 can transmit a ready control signal 112 to the measurement unit 622 after initialization of the positioning unit 624 is complete and the positioning unit 624 is ready to compute a position, velocity, and time of the electronic device 600. The measurement unit 622 can generate pseudo-range measurements in response to receiving both the lock control signal 110 from the acquisition and tracking unit 620 and the ready control signal 112 from the positioning unit 624. The positioning unit 624 can analyze the pseudo-range measurements to determine the position, velocity, and time of the electronic device 600.

It should be noted that any one of the above-described functionalities might be partially (or entirely) implemented in hardware and/or on the processor device 602. For example, the functionality may be implemented with an application specific integrated circuit, in logic implemented in the processor device 602, in a co-processor on a peripheral device or card, etc. Further, realizations may include fewer or additional components not illustrated in FIG. 6 (e.g., additional network interfaces, peripheral devices, etc.). The processor device 602 and the network interfaces 604 are coupled to the bus 610. Although illustrated as being coupled to the bus 610, the memory unit 606 may be coupled to the processor device 602. Furthermore, any one or more of the acquisition and tracking unit 620, the measurement unit 622, and the positioning unit 624 can be implemented on a separate chip, a system on a chip (SoC), an application-specific integrated circuit (ASIC), etc While the embodiments are described with reference to various implementations and exploitations, it will be understood that these embodiments are illustrative and that the scope of the inventive subject matter is not limited to them. In general, techniques for synchronized measurement sampling in a navigation device as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
providing, from a tracking unit of a navigation device to a measurement unit of the navigation device, a first indication that a predetermined number of navigation satellites have been acquired and that navigation signals transmitted by the acquired navigation satellites have been locked;
providing, from a positioning unit of the navigation device to the measurement unit of the navigation device, a second indication that the positioning unit of the navigation device has been initialized to compute navigation parameters of the navigation device for positioning and routing the navigation device;
in response to the measurement unit of the navigation device receiving the first indication and the second indication, determining pseudo-range measurements at the measurement unit based, at least in part, on the navigation signals transmitted by the acquired navigation satellites; and
computing, at the positioning unit, the navigation parameters of the navigation device based, at least in part, on the pseudo-range measurements.

2. The method of claim 1, further comprising:
determining, at the tracking unit of the navigation device, that the predetermined number of navigation satellites have been acquired and that the navigation signals transmitted by the acquired navigation satellites have been locked;
waiting, at the tracking unit, for a predetermined locking delay interval in response to said determining that the predetermined number of navigation satellites have been acquired and that the navigation signals transmitted by the acquired navigation satellites have been locked, wherein the predetermined locking delay interval enables the tracking unit to refine a lock established on the navigation signals transmitted by the acquired navigation satellites; and transmitting, from the tracking unit, the first indication to the measurement unit after the predetermined locking delay interval expires.

3. The method of claim 1, wherein the navigation parameters comprise at least one of a position of the navigation device, a velocity of the navigation device, and timing information associated with the navigation device.

4. The method of claim 1, wherein said computing the navigation parameters of the navigation device comprises computing a position of the navigation device based on previously stored navigation data associated with the predetermined number of navigation satellites, wherein the previously stored navigation data comprises at least an almanac and ephemeris associated with the predetermined number of navigation satellites.

5. The method of claim 1, wherein said providing the first indication comprises providing a first control signal indicating that the predetermined number of navigation satellites have been acquired and that the navigation signals transmitted by the acquired navigation satellites have been locked; and said providing the second indication comprises providing a second control signal indicating that the positioning unit of the navigation device has been initialized to compute the navigation parameters of the navigation device.

6. The method of claim 5, wherein each of said providing the first control signal and said providing the second control signal comprises one of transmitting a message, transmitting a voltage level on a physical wire, and setting a bit in a configuration register.

7. The method of claim 1, wherein the predetermined number of navigation satellites comprises four or more navigation satellites.

8. The method of claim 1, further comprising at least one of:

providing the navigation parameters of the navigation device for presentation by the navigation device, and determining a route to a destination based, at least in part, on the navigation parameters of the navigation device.

9. The method of claim 1, wherein:

said providing, from the tracking unit to the measurement unit, providing the first indication that the predetermined number of navigation satellites have been acquired and that the navigation signals transmitted by the acquired navigation satellites have been locked is prior to said providing, from the positioning unit to the measurement unit, the second indication that the positioning unit of the navigation device has been initialized to compute the navigation parameters of the navigation device; or said providing, from the positioning unit to the measurement unit, the second indication that the positioning unit of the navigation device has been initialized to compute the navigation parameters of the navigation device is prior to said providing, from the tracking unit to the measurement unit, providing the first indication that the predetermined number of navigation satellites have been acquired and that the navigation signals transmitted by the acquired navigation satellites have been locked.

10. A navigation device comprising:

a tracking unit operable to provide, to a measurement unit of the navigation device, a first indication that a predetermined number of navigation satellites have been acquired and that navigation signals transmitted by the acquired navigation satellites have been locked;

a positioning unit operable to provide, to the measurement unit, a second indication that the positioning unit has been initialized to compute navigation parameters of the navigation device for positioning and routing the navigation device;

the measurement unit operable to determine pseudo-range measurements based, at least in part, on the navigation signals transmitted by the acquired navigation satellites in response to receiving the first indication from the tracking unit and the second indication from the positioning unit; and the positioning unit operable to compute the navigation parameters of the navigation device based, at least in part, on the pseudo-range measurements received from the measurement unit.

11. The navigation device of claim 10, wherein the tracking unit is further operable to:

determine that the predetermined number of navigation satellites have been acquired and that the navigation signals transmitted by the acquired navigation satellites have been locked;

wait for a predetermined locking delay interval in response to the tracking unit determining that the predetermined number of navigation satellites have been acquired and that the navigation signals transmitted by the acquired navigation satellites have been locked, wherein the predetermined locking delay interval enables the tracking unit to refine a lock established on the navigation signals transmitted by the acquired navigation satellites; and transmit the first indication to the measurement unit after the predetermined locking delay interval expires.

12. The navigation device of claim 10, wherein the positioning unit operable to compute the navigation parameters of the navigation device comprises the positioning unit operable to compute a position of the navigation device based on previously stored navigation data associated with the predetermined number of navigation satellites, wherein the previously stored navigation data comprises at least an almanac and ephemeris associated with the predetermined number of navigation satellites.

13. The navigation device of claim 10, wherein the tracking unit operable to provide the first indication to the measurement unit comprises the tracking unit operable to provide a first control signal indicating that the predetermined number of navigation satellites have been acquired and that the navigation signals transmitted by the acquired navigation satellites have been locked; and the positioning unit operable to provide the second indication to the measurement unit comprises the positioning unit operable to provide a second control signal indicating that the positioning unit has been initialized to compute the navigation parameters of the navigation device.

14. The navigation device of claim 10, wherein the positioning unit further operable to:

provide the navigation parameters of the navigation device for presentation by the navigation device, and determine a route to a destination based, at least in part, on the navigation parameters of the navigation device.

15. The navigation device of claim 10, wherein the navigation parameters comprise at least one of a position of the navigation device, a velocity of the navigation device, and timing information associated with the navigation device.

16. One or more non-transitory machine-readable storage media, having instructions stored therein, which, when executed by one or more processors causes the one or more processors to perform operations that comprise:

acquiring a predetermined number of navigation satellites at a navigation device;

locking onto navigation signals transmitted by the acquired predetermined number of navigation satellites;

initializing a positioning unit of the navigation device to compute navigation parameters of the navigation device for positioning and routing the navigation device;

generating a first indication that the predetermined number of navigation satellites have been acquired and that the navigation signals transmitted by the acquired navigation satellites have been locked;

generating a second indication that the positioning unit of the navigation device has been initialized to compute the navigation parameters of the navigation device;

in response to detecting the first indication and the second indication, determining pseudo-range measurements based, at least in part, on the navigation signals transmitted by the acquired navigation satellites; and computing the navigation parameters of the navigation device based, at least in part, on the pseudo-range measurements.

17. The machine-readable storage media of claim 16, wherein the operations further comprise:

determining that the predetermined number of navigation satellites have been acquired and that the navigation signals transmitted by the acquired navigation satellites have been locked;

waiting for a predetermined locking delay interval in response to said operation of determining that the predetermined number of navigation satellites have been acquired and that the navigation signals transmitted by the acquired navigation satellites have been locked, wherein the predetermined locking delay interval enables a lock established on the navigation signals transmitted by the acquired navigation satellites to be refined; and transmitting the first indication after the predetermined locking delay interval expires.

18. The machine-readable storage media of claim 16, wherein said operation of generating the first indication comprises generating a first control signal indicating that the predetermined number of navigation satellites have been acquired and that the navigation signals transmitted by the acquired navigation satellites have been locked; and said operation of generating the second indication comprises generating a second control signal indicating that the positioning unit of the navigation device has been initialized to compute the navigation parameters of the navigation device.

19. The machine-readable storage media of claim 18, wherein each of said operation of generating the first control signal and said operation of generating the second control signal comprises one of generating a message, generating a voltage level on a physical wire, and setting a bit in a configuration register.

20. The machine-readable storage media of claim 16, wherein the operations further comprise at least one of:

presenting the navigation parameters at the navigation device, and determining a route to a destination based, at least in part, on the navigation parameters of the navigation device.

\* \* \* \* \*